United States Patent
Boutnaru

(10) Patent No.: US 10,691,791 B2
(45) Date of Patent: Jun. 23, 2020

(54) AUTOMATIC UNPACKING OF EXECUTABLES

(71) Applicant: PayPal, Inc., San Jose, CA (US)

(72) Inventor: Shlomi Boutnaru, Modi'in-Maccabim-Re'ut (IL)

(73) Assignee: PayPal, Inc., San Jose, CA (US)

( * ) Notice: Subject to any disclaimer, the term of this patent is extended or adjusted under 35 U.S.C. 154(b) by 230 days.

(21) Appl. No.: 15/636,905

(22) Filed: Jun. 29, 2017

(65) Prior Publication Data
US 2019/0005226 A1    Jan. 3, 2019

(51) Int. Cl.
*G06F 21/51* (2013.01)
*G06F 21/55* (2013.01)
*G06F 21/56* (2013.01)

(52) U.S. Cl.
CPC ........... *G06F 21/51* (2013.01); *G06F 21/554* (2013.01); *G06F 21/566* (2013.01); *G06F 2221/034* (2013.01)

(58) Field of Classification Search
CPC .. G06F 21/51; G06F 21/566; G06F 2221/034; G06F 21/554
See application file for complete search history.

(56) References Cited

U.S. PATENT DOCUMENTS

| | | | |
|---|---|---|---|
| 7,568,233 B1* | 7/2009 | Szor | G06F 21/564 726/22 |
| 2005/0172337 A1* | 8/2005 | Bodorin | G06F 21/51 726/22 |
| 2014/0283058 A1* | 9/2014 | Gupta | G06F 21/566 726/23 |
| 2016/0292417 A1* | 10/2016 | Malik | G06F 21/562 |
| 2018/0114018 A1* | 4/2018 | Zhang | G06F 21/562 |

* cited by examiner

*Primary Examiner* — Baotran N To
(74) *Attorney, Agent, or Firm* — Kowert, Hood, Munyon, Rankin & Goetzel, P.C.

(57) ABSTRACT

Provided are methods and systems for unpacking and analyzing malware for purposes of identification and investigation. A malicious executable or an application containing malicious code is executed in sandboxed memory to unpack the executable. The memory is then dumped to disk and one or more post-processing operations are performed to generate a new version of the executable, including identifying an initial entry point of the executable, recreating the relocation table, and recreating the import address table, export table, and other tables of the executable. Various types of analyses, such as static analyses, which could not be performed on the malicious executable, are able to be performed on the new version of the executable.

20 Claims, 5 Drawing Sheets

AUTOMATIC UNPACKING OF EXECUTABLES

FIELD OF THE DISCLOSURE

The present application relates generally to information security and, more particularly, to unpacking an executable for identification and analysis.

BACKGROUND

In today's network security environment, creators of malware are aware that various anti-virus solutions may attempt to identify or investigate them, e.g., by creating a signature for a malware program. For these reasons, malware authors are using sophisticated obfuscation techniques to disguise their malware to appear one way on disk and appear a different way when executed in memory. For example, packer-based malware is malware that is modified on disk using various compression and/or encryption techniques to hide the code's real intention. Such packed malware is resilient to static analysis because on disk it may be non-identifiable.

SUMMARY OF THE DISCLOSURE

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

One embodiment of the present disclosure relates to a method comprising: receiving, at a computer system, a malicious executable; executing the executable in a physical memory associated with one or more processors, whereby executing the executable unpacks the executable; creating a memory dump of the physical memory containing the executed executable to a storage device associated with the one or more processors; and performing one or more post-processing operations to generate a new version of the executable.

Another embodiment of the present disclosure relates to a system, comprising one or more processors and one or more non-transitory memories coupled to the one or more processors, the one or more memories storing machine readable instructions that, when executed by the one or more processors, cause a system to perform operations comprising: unpacking a malicious program file by executing the program file in a first memory device; dumping the first memory device containing the unpacked program file to a second memory device; identifying an initial entry point of the program file; and creating a new version of the program file from a memory image of the unpacked program file, the new version of the program file including the initial entry point.

Yet another embodiment of the present disclosure relates to a tangible, non-transitory computer readable medium storing machine readable instructions that, when executed by one or more processors, cause the one or more processors to perform operations comprising: executing a packed malicious file in a memory to unpack the file; dumping the memory containing the unpacked file to a storage device; identifying an unpacking function of the file; performing one or more post-processing operations based on the unpacking function; and creating a new version of the file based on the one or more post-processing operations.

Further scope of applicability of the methods and systems of the present disclosure will become apparent from the more detailed description given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

These and other objects, features, and characteristics of the present disclosure will become more apparent to those skilled in the art from a study of the detailed description that follows in conjunction with the appended claims and drawings, all of which form a part of this disclosure. In the drawings:

The headings provided herein are for convenience only and do not affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

In various embodiments described below, techniques are provided for unpacking and analyzing malware (which may sometimes be referred to herein as "malicious executable,"

"malicious code," "malicious program," "malicious file," or the like) to make the malware accessible/usable for further analysis (e.g., static analysis) and investigation. In an embodiment, a malicious file that is received may be executed in a sandbox (e.g., a computer security technique that isolates running programs to prevent a malicious or malfunctioning program from causing harm to other programs, the host machine, or operating system), and then the memory of the file may be dumped while the initial entry point of the file is changed to be the point after the unpacking function. As will be described in greater detail below, in at least one embodiment, once malicious code is executed and finishes unpacking (e.g., decrypting, decompressing, etc.), the memory of the code may be dumped to disk and a new executable file may be created from the memory image of the code. With the new executable file it is possible to perform various analyses (e.g., static analyses) that were not able to be performed on the received malicious executable, in an embodiment.

Figure 1:
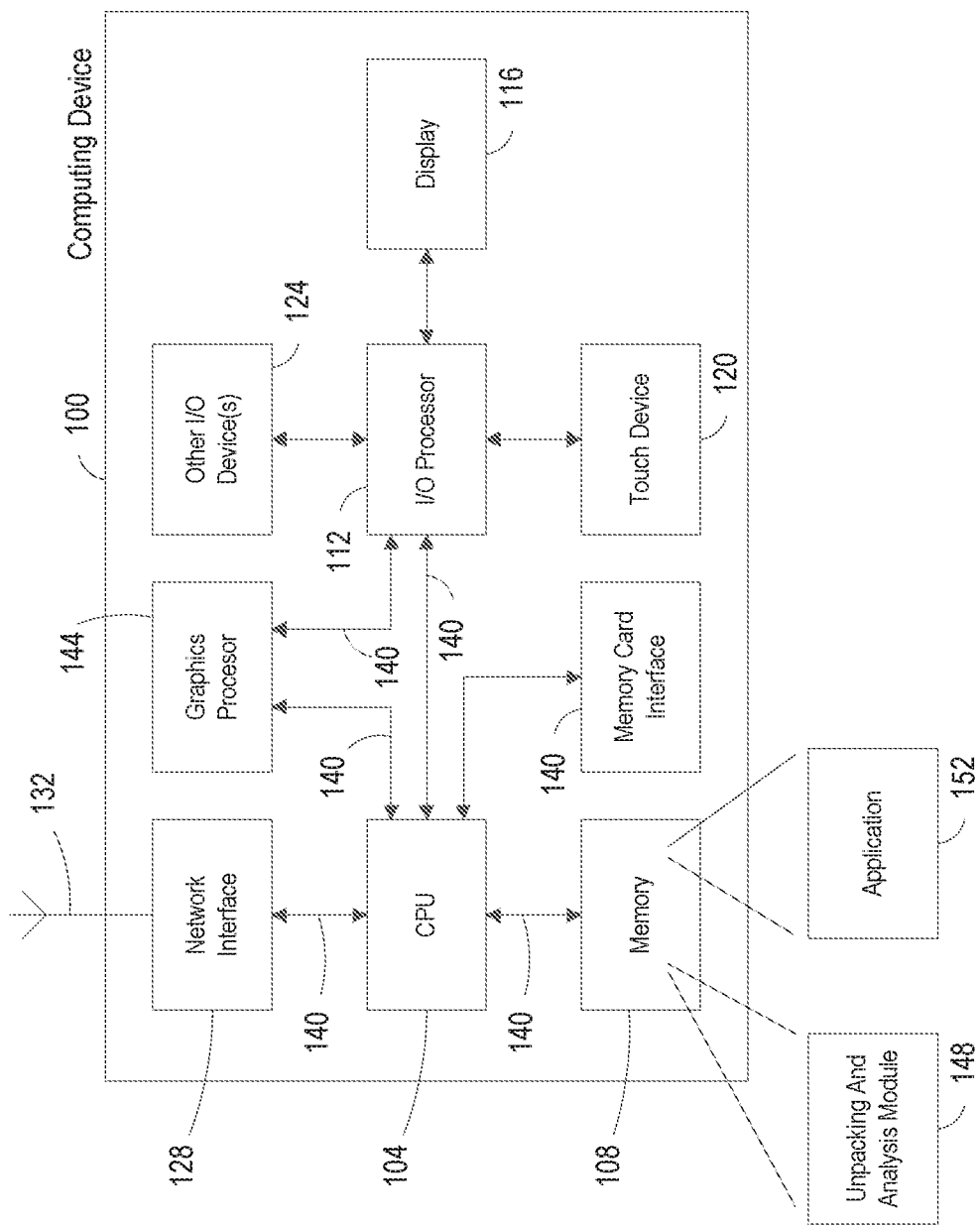
FIG. 1 is a block diagram of an example computing device configured to implement malware unpacking and analysis techniques described herein, according to one or more embodiments.

FIG. 1 is a diagram of an example computing device 100 (e.g., mobile computing device) that may implement an unpacking and analysis module configured to automatically unpack a malicious executable for analysis, according to some embodiments. The device 100 includes one or more central processing units (CPUs) 104 (hereinafter referred to as "the CPU 104" for purposes of brevity) coupled to a memory 108 (which can include one or more computer readable storage media such as random access memory (RAM), read only memory (ROM), FLASH memory, a hard disk drive, a digital versatile disk (DVD) disk drive, a Blu-ray disk drive, etc.). The device also includes one or more input/output (I/O) processors 112 (hereinafter referred to as "the I/O processor 112" for purposes of brevity) that interfaces the CPU 104 with a display device 116 and a touch-sensitive device or touchscreen 120 (e.g., a single-touch or multi-touch touchscreen). The I/O processor 112 also may interface one or more additional I/O devices 124 to the CPU 104, such as one or more buttons, click wheels, a keyboard, a keypad, a touch pad, another touchscreen (single-touch or multi-touch), lights, a speaker, a microphone, etc.

A network interface 128 is coupled to the CPU 104 and to one or more antennas 132. A memory card interface 136 is coupled to the CPU 104. The memory card interface 136 is adapted to receive a memory card such as a secure digital (SD) card, a miniSD card, a microSD card, a Secure Digital High Capacity (SDHC) card, etc., or any suitable card.

The CPU 104, the memory 108, the I/O processor 112, the network interface 128, and the memory card interface 136 are coupled to one or more busses 140. For example, the CPU 104, the memory 108, the I/O processor 112, the network interface 128, and the memory card interface 136 are coupled to a single bus 140, in an embodiment. In another embodiment, the CPU 104 and the memory 108 are coupled to a first bus, and the CPU 104, the I/O processor 112, the network interface 128, and the memory card interface 136 are coupled to a second bus. In other embodiments, more than two busses are utilized.

The device 100 also may include a graphics processor 144 coupled to the display 116 and to the CPU 104. The graphics processor 144 may be coupled to the display 116 via the I/O processor 112. The graphics processor 144 may be coupled to the CPU 104 and the I/O processor 112 via one or more busses 140.

The device 100 is only one example of a computing device 100, and other suitable devices can have more or fewer components than shown, can combine two or more components, or a can have a different configuration or arrangement of the components. The various components shown in FIG. 1 can be implemented in hardware, one or more processors executing software or firmware instructions or a combination of both i) hardware and ii) one or more processors executing software or firmware instructions, including one or more integrated circuits (e.g., an application specific integrated circuit (ASIC)).

The CPU 104 executes computer readable instructions stored in the memory 108. The I/O processor 112 interfaces the CPU 104 with input and/or output devices, such as the display 116, the touch screen 120, and other input/control devices 124. Similarly, the graphics processor 144 executes computer readable instructions stored in the memory 108 or another memory (not shown) associated with the graphics processor 144. The I/O processor 112 interfaces the graphics processor 144 with the display 116 and, optionally other input/control devices.

The I/O processor 112 can include a display controller (not shown) and a touchscreen controller (not shown). The touchscreen 120 includes one or more of a touch-sensitive surface and a sensor or set of sensors that accepts input from the user based on haptic and/or tactile contact. The touchscreen 120 utilizes one or more of currently known or later developed touch sensing technologies, including one or more of capacitive, resistive, infrared, and surface acoustic wave technologies, as well as other proximity sensor arrays or other elements for determining one or more points of contact with the touchscreen 120. The touchscreen 120 and the I/O processor 112 (along with any associated modules and/or sets of instructions stored in memory 102 and executed by the CPU 104) can detect one or more points of or instances of contact (and any movement or breaking of the contact(s)) on the touchscreen 120, in some embodiments. Such detected contact can be converted by the CPU 104 into interaction with a user-interface mechanism that is displayed on the display 116. A user can make contact with the touchscreen 120 using any suitable object or appendage, such as a stylus, a finger, etc. In some embodiments, the touchscreen 120 includes force sensors that measure an amount of force applied by a touch. In such embodiments, an amount of force applied in connection with a contact can be utilized to distinguish between different user-requested actions. For example, a contact made with a relatively light touch may correspond to a first requested action (e.g., select an object), whereas a relatively forceful touch may correspond to a second requested action (e.g., select an object and open pop-up menu associated with the selected object).

The network interface 128 facilitates communication with a wireless communication network such as a mobile communications network, a wireless local area network (WLAN), a wide area network (WAN), a personal area network (PAN), etc., via the one or more antennas 132. In other embodiments, one or more different and/or additional network interfaces facilitate wired communication with one or more of a local area network (LAN), a WAN, another computing device such as a personal computer, a server, etc.

Software components or modules (i.e., sets of computer readable instructions executable by the CPU 104) are stored in the memory 108 and/or a separate memory (not shown) associated with the graphics processor. The software components can include an operating system, a communication module, a contact module, a graphics module, and applications such as a computational application, a data processing application, a software code editor, etc. The operating system can include various software components and/or drivers for controlling and managing general system tasks (e.g., memory management, etc.) and can facilitate communication between various hardware and software components. The communication module can facilitate communication with other devices via the network interface 128.

The contact module can detect contact with the touchscreen 120 (in conjunction with the I/O processor 112). The contact module can include various software components for performing various operations related to detection of contact, such as determining if contact has occurred, determining if there is movement of the contact and tracking the movement across the touchscreen 120 (in some embodiments), determining an amount of force in connection with the contact (in some embodiments), and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/multiple finger contacts), in some embodiments.

The graphics module can include various suitable software components for rendering and displaying graphics objects on the display 116. As used herein, the term "graphics" includes any object that can be displayed to a user, including without limitation text, web pages, icons, symbols, digital images, etc.

An unpacking and analysis module 148 includes machine readable instructions that, when executed by one or more processors (such as the CPU 104 and/or the graphics processor 144), cause a system including the one or more processors to (i) execute a malicious file (e.g., received at the computing device 100) in a first portion of memory 108 (e.g., a sandboxed portion of memory), (ii) dump the first portion of memory 108 to a second portion of memory 108 (e.g., a hard disk drive) while changing an Entry Point of the malicious file to a point after an unpacking function of the file, (iii) and create a new executable from the memory image of the file.

In embodiments in which the CPU 104 executes at least portions of the unpacking and analysis module 148, the unpacking and analysis module 148 may be stored in the memory 108. In embodiments in which the graphics processor 144 executes at least portions of the unpacking and analysis module 148, the unpacking and analysis module 148 may be stored in the memory 108 and/or in another memory (not shown) of or coupled to the graphics processor 144. In some embodiments, the memory 108 is coupled to the graphics processor 144.

An application module 152, stored in the memory 108, may, when executed by the CPU 104, interact with the unpacking and analysis module 148. For example, in embodiments in which the application module 152 is an application for predicting future malware, the application module 152 may utilize the unpacking and analysis module 148 to analyze malicious executables and improve the generation of malware variants. As another example, in embodiments in which the application module 152 is an application for protecting against various malicious elements, the application module 152 may utilize the unpacking and analysis module 148 to render a malicious executable susceptible to various types of analyses such as, for example, static analyses. As yet another example, in embodiments in which the application module 152 is an application for evaluating existing (e.g., network or computer) security systems, the application module 152 may utilize the unpacking and analysis module 148 to generate various statistics and/or data related to malicious files to identify potential vulnerabilities.

Each of the above identified modules and applications can correspond to a set of instructions that, when executed by one or more processors, cause one or more functions described above to be performed. These modules need not be implemented as separate software programs, procedures or modules, and thus various subsets of these modules can be combined or otherwise re-arranged in various embodiments. For example, in some embodiments, the unpacking and analysis module 148 is a component of the application module 152. In some embodiments, the memory 108 (and separate memory associated with the graphics processor, when included) stores a subset of the modules and data structures identified above. In other embodiments, the memory 108 (and separate memory associated with the graphics processor, when included) stores additional modules and data structures not described above.

In various examples and embodiments described below, computer memories and processors are described with reference to the device 100 of FIG. 1 for ease of explanation. In other embodiments, another suitable device different than the device 100 is utilized for processing and/or storage. For example, other suitable devices include desktop computers, laptop computers, tablet computers, a smart phone, servers, computer gaming systems, cable television set top boxes, televisions, etc. Such other suitable devices may have a basic structure similar to the device 100 of FIG. 1.

Figure 2:
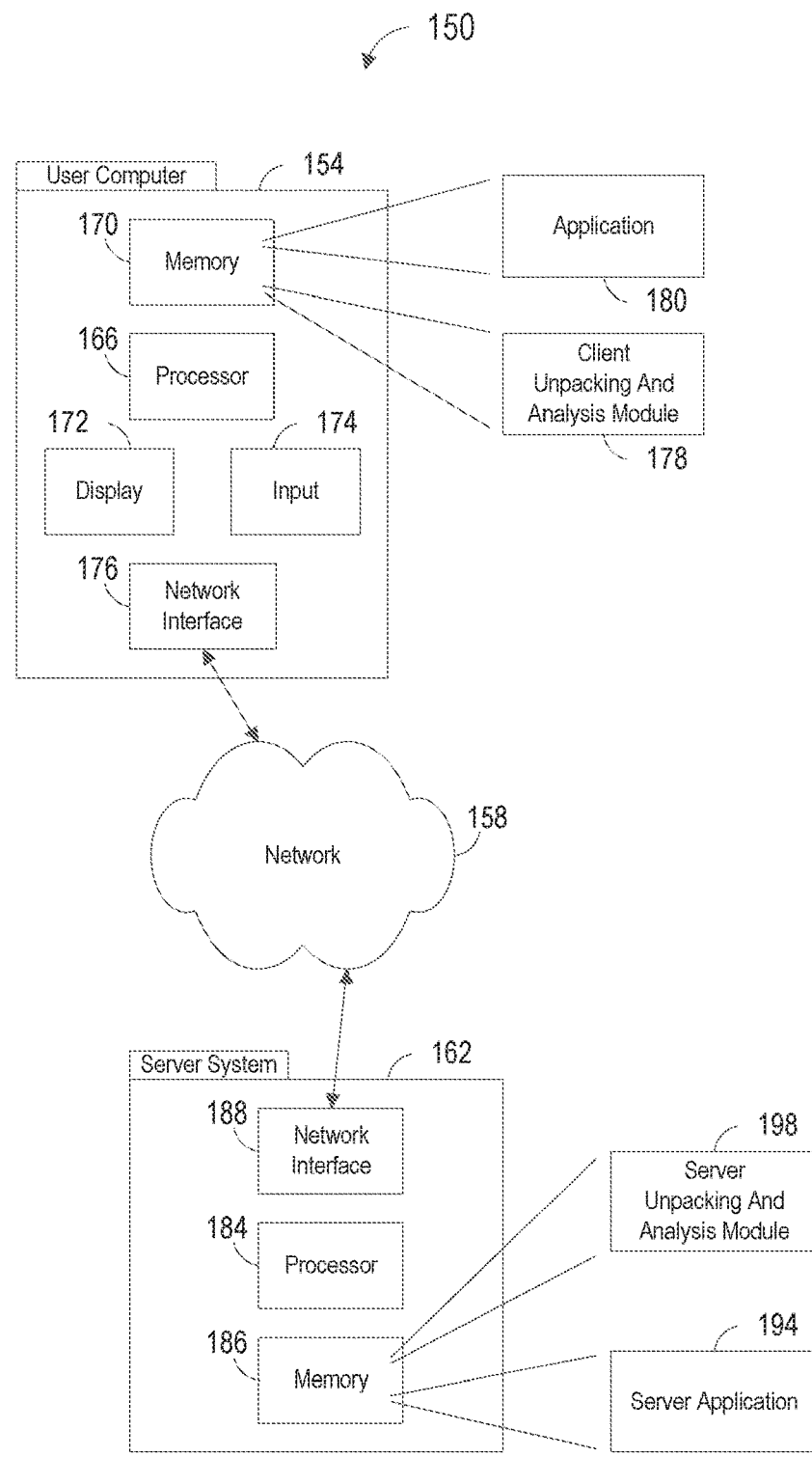
FIG. 2 is a block diagram of an example system configured to implement malware unpacking and analysis techniques described herein, according to one or more embodiments.

FIG. 2 is a diagram of an example system 150 which may implement an unpacking and analysis module configured to automatically unpack a malicious executable for analysis, according to some embodiments.

A user computer 154 is configured to implement an unpacking and analysis module alone, in one embodiment, or in conjunction with a server system 162, in another embodiment. In embodiments that include the server system 162, the user computer 154 is communicatively coupled to a communication network 158 including, for example, one or more of the Internet, an intranet, an extranet, a mobile communications network, etc., and the server system 162 is also communicatively coupled to the network 158. In embodiments that include the server system 162, the user computer 154 is configured to communicate with the server system 162 via the network 158.

The user computer 154 may be (or include) a computing device such as a desktop computer, a laptop computer, a tablet computer, a smart phone, a computer gaming system, a cable television set top box, etc. The user computer 154 may include one or more processors 166 (e.g., one or more CPUs, one or more coprocessors, and/or a graphics processor), one more memory devices 170 (e.g., random access memory (RAM), read only memory (ROM), FLASH memory, a magnetic disk, an optical disk, etc.), one or more display devices 172 (e.g., integral display device and/or external display device), and one or more input devices 174, such as a keyboard, a keypad, a button, a mouse, a trackball, a touch screen, a multi-touch screen, a touch pad, etc. The user computer 154 may include a network interface 176 to communicatively couple the user computer 154 to the network 158. At least some of the one or more processors 166 (hereinafter referred to as "the processor 166" for purposes of brevity), the one or more memory devices 170 (hereinafter referred to as "the memory device 170" for purposes of brevity), the one or more display devices 172 (hereinafter referred to as "the display device 172" for purposes of brevity), the one or more input devices 174 (hereinafter referred to as "the input device 174" for purposes of brevity), and the network interface 176 may be communicatively coupled together via one or more busses (not shown), cords (not shown), etc. In embodiments in which the user computer 154 comprises a set top box or a gaming system, for example, the display 172 may comprise a television communicatively coupled to the set top box or the gaming system.

The memory device 170 may store all or a portion of a client unpacking and analysis module 178. The client unpacking and analysis module 178, when executed by the processor 166, may cause the processor 166 to (i) execute a malicious file (e.g., received at the user computer 154) in a first portion of memory 170 (e.g., a sandboxed portion of memory 170), (ii) dump the first portion of memory 170 to a second portion of memory 170 (e.g., a hard disk drive) while changing an Entry Point of the malicious file to a point after an unpacking function of the file, (iii) and create a new executable from the memory image of the file, in an embodiment. As will be discussed in greater detail below, the client unpacking and analysis module 178 may perform one or more post-processing operations in connection with a malicious executable using information (e.g., malware statistics, application statistics, etc.) received from the server system 162, in some embodiments in which the server system 162 is included.

An application module 180, stored in the memory 170, may, when executed by the processor 166, interact with the client unpacking and analysis module 178. For example, in embodiments in which the application module 180 is an application for predicting future malware, the application module 180 may utilize the client unpacking and analysis module 178 to analyze malicious executables and improve the generation of malware variants. As another example, in embodiments in which the application module 180 is an application for protecting against various malicious elements, the application module 180 may utilize the client unpacking and analysis module 178 to render a malicious executable susceptible to various types of analyses such as, for example, static analyses. As yet another example, in embodiments in which the application module 180 is an application for evaluating existing (e.g., network or computer) security systems, the application module 180 may utilize the client unpacking and analysis module 178 to generate various statistics and/or data related to malicious files to identify potential vulnerabilities.

In an embodiment, the application 180 may comprise a front end system that interfaces with a kernel implemented by the server system 162. In this embodiment, the front end system implemented by the user computer 154 may receive user input corresponding to functions commands, instructions, etc., and forward the user input to the server system 162. The kernel implemented on the server system 162 may then execute or interpret the entered functions, commands, instructions, etc., and perform corresponding numerical and/or symbolic calculations to generate corresponding results. The server system 162 may then transmit the results to the user computer 154, and the front end system implemented by the user computer 154 may then perform one or more operations using the results (e.g., store the results in memory 170, utilize the results to generate a graphical user interface on the display 172, and the like).

More generally, in some embodiments, the application 180 may comprise a client-side module that interfaces with a server-side module implemented by the server system 162. In some embodiments, the application 180 is an intranet or secure web portal. For instance, in one embodiment, the server system 162 may implement a malware prediction application, and a user may utilize the malware prediction application by way of an intranet or secure web portal 180 implemented by the user computer 154. In this embodiment, the user computer 154 may receive user input corresponding to functions commands, instructions, etc. entered by the user by way of a web page that includes one or more user interface mechanisms for entering input related to a malicious file to be investigated and/or blocked.

Input entered by the user is forwarded to the server system 162. The malware prediction application implemented on the server system 162 may then execute or interpret the entered functions, commands, instructions, etc., and perform corresponding numerical and/or symbolic calculations, or various lookup operations, to generate corresponding results. The server system 162 may then generate a web page to display the results, in an embodiment. In other embodiments, the server system 162 may generate the results in a different format or electronic medium. The results are transmitted by the server system 162 to the user computer 154. In some embodiments, the results are transmitted by the server system 162 to the user computer 154 as a web page, for example. A web browser, intranet, or secure portal implemented by the user computer 154 may then display the results.

The server system 162 may comprise one or more computing devices such as a desktop computer, a server, a mainframe, etc. The server system 162 may include one or more processors 184 (hereinafter referred to as "the processor 184" for purpose of brevity), one more memory devices 186 (e.g., RAM, ROM, FLASH memory, a magnetic disk, an optical disk, a database system, etc.) (hereinafter referred to as "the memory device 186" for purpose of brevity), and a network interface 188 to communicatively couple the server system 162 to the network 158. At least some of the processor 184, the memory device 186, and the network interface 188 may be communicatively coupled together via one or more of 1) one or more busses, 2) one or more networks (e.g., a local area network (LAN), a wide area network (WAN), etc.) 3) point-to-point communication links, 4) cords, etc. (not shown).

The memory device 186 may store a server application 194 that is executed by the processor 184. The server application 194 may comprise a web server application, a malware prediction application, etc., in various embodiments.

In an embodiment, the server application 194 comprises a malware prediction application that, when executed by the processor 184, may perform various numerical, graphical, and/or symbolic calculations corresponding to functions, commands, instructions, etc., entered by the user in connection with predicting future malware and variants of known malware. For example, the server application 194 may execute or interpret the functions, commands, instructions, etc., received from the user computer 154, and perform corresponding numerical and/or symbolic calculations, or corresponding lookup operations, to generate corresponding results. In embodiments in which the server system 162 implements a kernel of a malware prediction application, the server application 194 may cause the server system 162 to transmit the results to the user computer 154 via the network 158. In embodiments in which the server system 162 implements a full malware prediction application 194, in which the malware prediction application 194 may generate updated information (e.g., statistics, identifiers, etc.) about future malware and variants thereof, potential vulnerabilities of existing security systems, etc., that includes the results as a web page, for example, and may cause the server system 162 to transmit the web page to the user computer 154 via the network 158.

The memory device 186 may store a server unpacking and analysis module 198 that is executed by the processor 184. The server unpacking and analysis module 198 may provide information for use by the client unpacking and analysis module 178 in performing one or more of the post-processing operations described above. For example, information generated by the server unpacking and analysis module 197 may be transmitted by the server system 162 to the user computer 154. For example, the server unpacking and analysis module 198 may provide information that, when utilized by the client unpacking and analysis module 178, allows the client unpacking and analysis module 178 to perform one or more post-processing operations, in some embodiments. In some embodiments, the client unpacking and analysis module 178 is omitted and the server unpacking and analysis module 198 performs the post-processing operations directly, for example.

Figure 3:
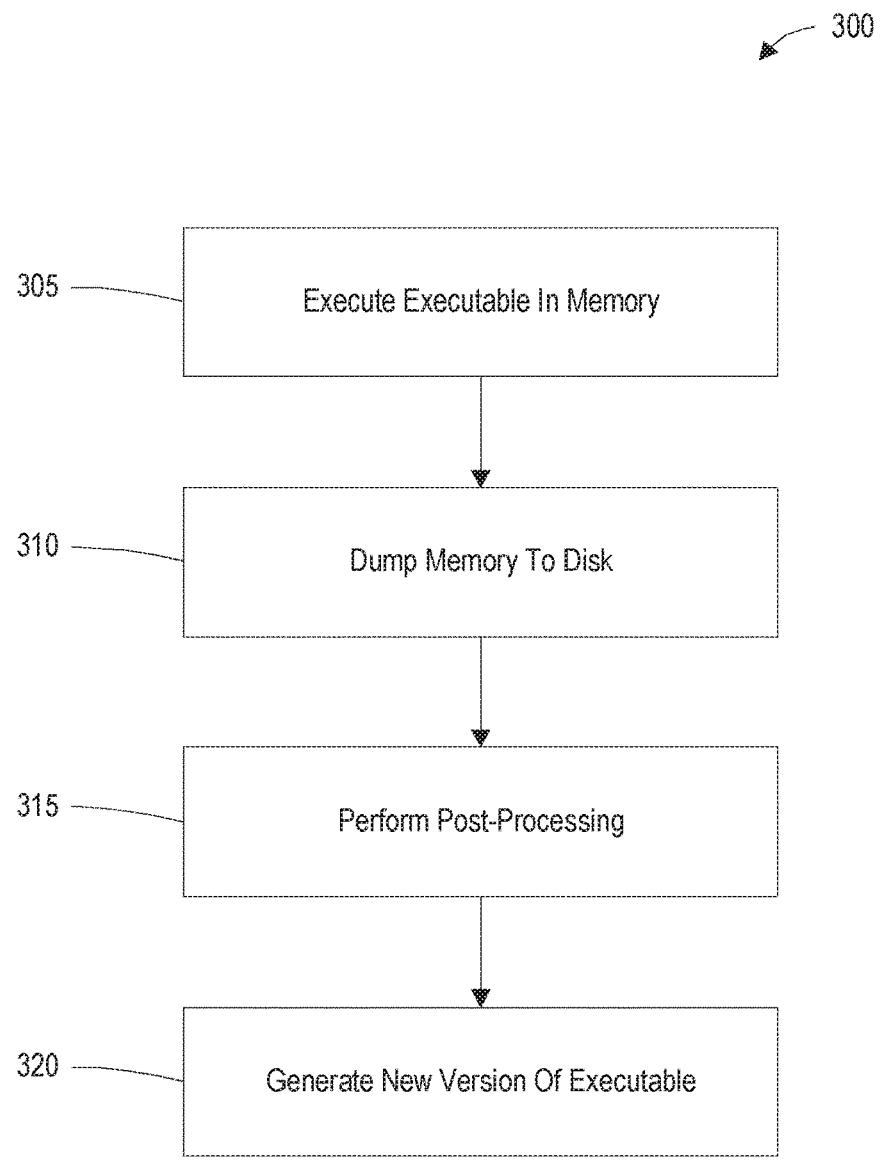
FIG. 3 is a flow diagram illustrating an example method for unpacking and analyzing malware, according to one or more embodiments.

FIG. 3 illustrates an example process 300 for unpacking and analyzing malware in accordance with one or more embodiments described herein. In an embodiment, blocks 305-320 of the example process 300 may be performed by an unpacking and analysis module (e.g., unpacking and analysis module 148 implemented by computing device 100 shown in FIG. 1). In an embodiment, blocks 305-320 of the example process 300 may be performed by a client unpacking and analysis module (e.g., client unpacking and analysis module 178 implemented by user computer 154 in the example system 150 shown in FIG. 2). In another embodiment, blocks 305-320 of the example process 300 may be performed by a server unpacking and analysis module (e.g., server unpacking and analysis module 198 implemented by sever system 162 in the example system 150 shown in FIG. 2). In some embodiments, some of blocks 305-320 of the example process 300 may be performed by a client unpacking and analysis module and other of blocks 305-320 may be performed by a server unpacking and analysis module.

In an embodiment, at block 305, a malicious executable may be executed in memory (e.g., a portion (e.g., RAM) of memory 108 in the example computing device 100 shown in FIG. 1). At block 310, the memory may then be dumped to disk (e.g., a storage device such as, for example, a hard drive, which may be a portion of memory 108 in the example computing device 100). At block 315, one or more post-processing operations may be performed. At block 320, a new version of the executable may be generated (e.g., created), where the new version of the executable is susceptible to various types of analyses (e.g., static analyses) for identification, investigation, and/or blocking purposes.

Further details about the various operations and/or functions of blocks 305-320 of example process 300 will be provided in the sections below.

Figure 4:
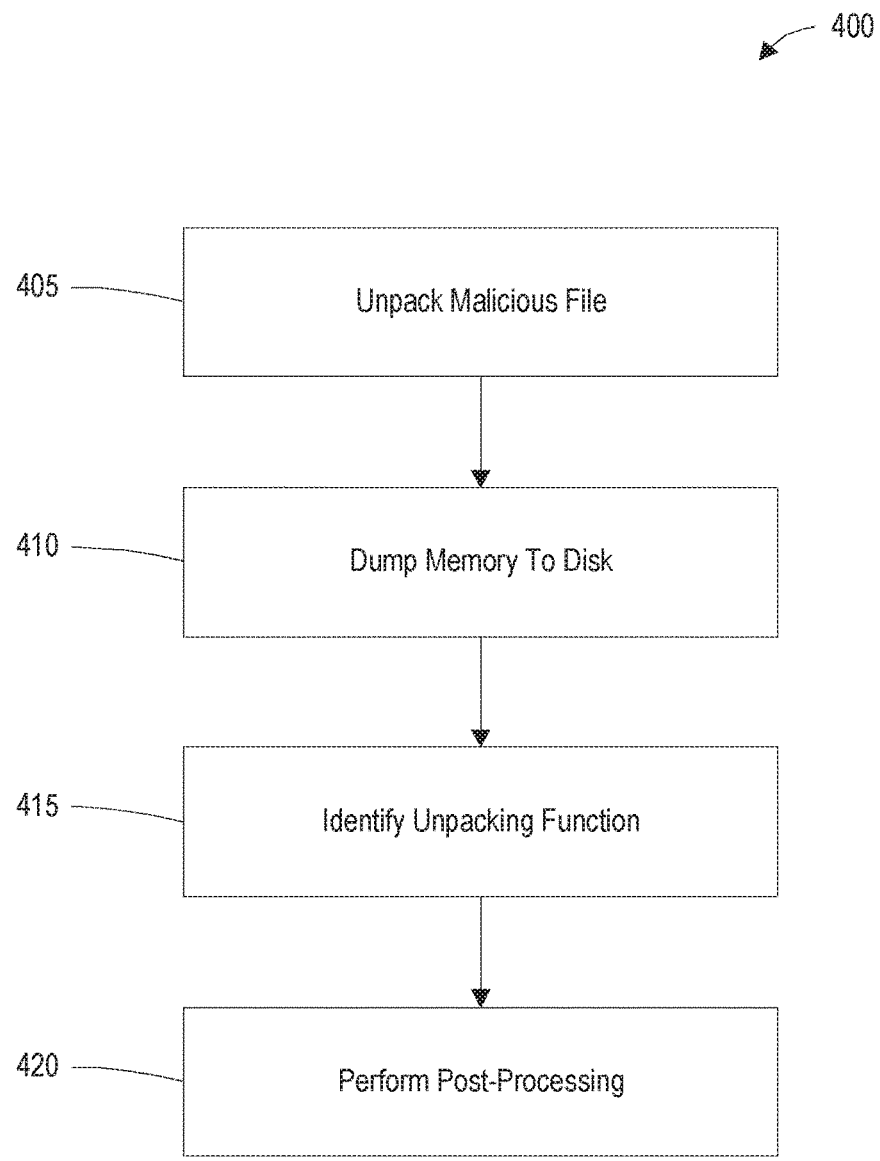
FIG. 4 is a flow diagram illustrating an example method for unpacking and analyzing malware, according to one or more embodiments.

FIG. 4 illustrates another example process 400 for unpacking and analyzing malware in accordance with one or more embodiments described herein. In an embodiment, blocks 405-420 of the example process 400 may be performed by an unpacking and analysis module (e.g., unpacking and analysis module 148 implemented by computing device 100 shown in FIG. 1). In an embodiment, blocks 405-420 of the example process 400 may be performed by a client unpacking and analysis module (e.g., client unpacking and analysis module 178 implemented by user computer 154 in the example system 150 shown in FIG. 2). In another embodiment, blocks 405-420 of the example process 400 may be performed by a server unpacking and analysis module (e.g., server unpacking and analysis module 198 implemented by sever system 162 in the example system 150 shown in FIG. 2). In some embodiments, some of blocks 405-420 of the example process 400 may be performed by a client unpacking and analysis module and other of blocks 405-420 may be performed by a server unpacking and analysis module.

In an embodiment, at block 405, a malicious file may be unpacked by executing the file in memory (e.g., a portion (e.g., RAM) of memory 108 in the example computing device 100 shown in FIG. 1). At block 410, the memory may then be dumped to disk (e.g., a storage device such as, for example, a hard drive, which may be a portion of memory 108 in the example computing device 100). At block 415, an unpacking function of the file may be identified. For example, in an embodiment, an unpacking function may be identified at block 415 by comparing the packed malicious file to the unpacked file in memory. Based on the comparison, a portion of code present in the packed file that is also present in the unpacked file may be determined to be the unpacking function. In another embodiment, an unpacking function of the file may be identified at block 415 by comparing the packed malicious file to the unpacked file in memory. Based on the comparison, a portion of code present in the packed file that is not present in the unpacked file may be determined to be the unpacking function (e.g., where the unpacking function is deleted or freed from memory upon execution of the binary file). In yet another embodiment, an unpacking function of the file may be identified at block 415 by identifying a function that writes to a text section of the file in which code of a corresponding application resides. As described above, such a function that writes to a text section of the file may be identified as the unpacking function of the file, in an embodiment. At block 420, one or more post-processing operations may be performed based on the identified unpacking function (e.g., from block 415).

Further details about the various operations and/or functions of blocks 405-420 of example process 400 will be provided in the sections below.

In some embodiments, generating a new version of the executable includes creating a new executable file from the memory image of the received (unpacked) executable. Creating a new executable from the memory image in this manner allows various types of analyses (e.g., static analyses) to be performed on the executable, which were not possible to perform on the received version of the executable (e.g., a packed version stored on magnetic hard drive or other storage device).

In an embodiment, dumping the physical memory containing the executed executable to disk may include creating a memory dump of the physical memory and storing the created memory dump to a dedicated storage device. Numerous approaches for dumping memory are known to those of ordinary skill in the art, including hardware-based techniques, software-based techniques, as well as techniques that employ a combination of hardware and software. In some scenarios, a single dump of the memory may not be enough. As such, in some embodiments, a determination may be made as to whether a further dump of the memory is necessary following the initial dump. In a first example, suppose there is a malicious executable that is encrypted. In one embodiment, the malicious executable may be decrypted, executed, and then the memory may be dumped (e.g., following a brief interval of time such as 1 second, 2 seconds, etc.). Because the entire malicious code is unpacked following the execution, the memory may only need to be dumped one time. However, in some situations, which will be described in greater detail below, only a portion of malicious code may be unpacked following execution. For example, when executing especially malicious code in memory, it is possible that only a portion or part of the code will be unpacked. In other words, one or more portions or parts of the code may remain unpacked following execution. For example, in some instances executing malicious code will result in only unpacking a function that is called, or only unpacking a basic block of a function that is called (e.g., IF statement).

Once the malware is unpacked, one or more post-processing operations or techniques may be performed. In some embodiments, the post-processing may include identifying the initial entry point of the executable. In some embodiments, the post-processing may include fixing (e.g., repairing, recreating, restoring, etc.) the relocation table and/or other tables such as, for example, the import address table, export table, etc. In some embodiments, the post-processing may include both identifying the initial entry point of the executable and also recreating the relocation table and/or other tables.

Every executable (regardless of the application type) has an initial entry point, which is the first location of the first line of code that will be executed when the application is opened. For example, in the context of a Portable Executable (PE) file format, the initial entry point is a field in the PE header that stores the address of this first line of code (or first instruction) to be executed. Other file formats such as Executable and Linkable Format (ELF, also known as Extensible Linking Format), Android Package Kit (APK), and the like, similarly have an initial entry point.

When malware is packed (e.g., using a packer, which is a tool that compresses, encrypts, and/or modifies a malicious code's format), the initial entry point of the malware is changed. As such, once a malicious executable is unpacked, as described above, part of the post-processing that may be performed on the executable is to identify (e.g., determine) what that initial entry point of the executable was prior to being packed, so that the original file can be recovered. The reason that the initial entry point is changed when a malicious executable is packed is because during the packing process a stub of code is added for the purpose of unpacking. For example, in the context of packers that compress or encrypt a malicious file, a stub (a piece of code that contains the decompression or decryption routine) acts as a loader, which executes before the malware (e.g., once the file is running, the decompression stub stored in the packed file will decompress the packed section).

When the author of malware performs packing, the author adds a specific stub of code to the malware that is utilized for unpacking. As a result of adding this stub of code to the malware, the initial entry point is changed to point to the unpacking function. If, for example, a specific memory address space is to be dumped to disk, the initial entry point must be changed so that it is no longer pointing to the unpacking function, but instead is pointing to the actual (e.g., original) start of the application.

In accordance with some embodiments, the initial entry point of the executable may be identified (as part of the post-processing described above) based on one or more heuristics. For example, in an embodiment, the entropy of each section of the code may be calculated. For example, in an embodiment, the unpacking function may be identified, and by looking at the end of the unpacking function it can be determined to where control is passed. For example, the pointer (e.g., the memory address or location referenced by the pointer) to which that specific unpacking function calls or jumps at the end is consider the initial entry point, in an embodiment.

In an embodiment, a first heuristic that may be used is that the specific function that does the unpacking may be identified (e.g., determined) by taking the entire executed (unpacked) code which is on disk and comparing it to the entire code of the received binary file. The specific piece of the code that is the same in memory and in the executable is the unpacking function, according to an embodiment. This is because the unpacking function, by design, cannot be packed since if the unpacking function was packed, the executable would not be able to be unpacked.

In some scenarios, a malware author may design a malicious executable such that when the executable is unpacked, the unpacking function is quickly deleted or freed from memory. In such instances, it is of little use to attempt to identify the unpacking function by performing a comparison of the entire code on disk to the entire binary file, as the unpacking function no longer exists in memory (after the file has been unpacked). Instead, a second heuristic that may be utilized to identify the initial entry point and/or the unpacking function is determining which part of the executable was freed from memory and is also present in the binary file, in an embodiment.

A third heuristic that may be used for identifying the initial entry point and/or identifying the unpacking function is determining the differences between the unpacked executable. For example, if a file is compiled, most of the file will have an initial entry point that is barely in the same environment of the address of the memory. In accordance with an embodiment, the statistics of where (e.g., address of the memory) the initial entry point should be in different types of files (file formats) may be calculated and these statistics then compared to the unpacked executable. For example, in an embodiment, memory addresses neighboring (e.g., surrounding, nearby, etc.) the expected location of the initial entry point based on the statistics may be determined (e.g., identified, selected, etc.) to be candidate initial entry points for the executable. For each of these candidate initial entry points, a separate file (e.g., of the same or different file format type, or corresponding to one or more applications) may be created and then the application corresponding to each of the created files may be executed. Based on the outcome of executing the respective applications, the candidate initial entry point that is most likely (e.g., most probable) to be the actual initial entry point may be determined. For example, the candidate initial entry point corresponding to the application that does not crash (e.g., fail) when executed may be determined to be the actual initial entry point for the executable, in an embodiment.

In one or more embodiments, a fourth heuristic may be used to identify the unpacking function of the executable. For example, in an embodiment, the unpacking function of the executable may be identified as the function that writes to the area or section of the malicious code. With any executable created using any of the various types of compilers (e.g., Visual Studio, GCC, G++, etc.) known to those of ordinary skill in the art, when the executable file is created, the text section or the portion in which the code of the application resides is basically read or execute only, and not writeable. Because unpacking is to write or change the code section, it can be said that the unpacking function is a function that writes to the area of the code section where the application resides. As such, by determining which portion of the executable file writes to the code section, the unpacking function can be identified, in an embodiment. Further, the end of this unpacking function that jumps or calls to the code section can be determined to be the initial entry point for the executable, in an embodiment.

In some embodiments, the first heuristic described above may be utilized to determine the initial entry point and/or determine the unpacking function. In another embodiment, the second heuristic described above may be utilized to determine the initial entry point and/or determine the unpacking function. In another embodiment, the third heuristic described above may be utilized to determine the initial entry point and/or determine the unpacking function. In yet another embodiment, the fourth heuristic described above may be used to determine the initial entry point and/or the unpacking function of the executable. Further, in some embodiments, a combination of the first, second, and third heuristics may be used for determining the initial entry point and/or the unpacking function. It should also be understood that, in one or more embodiments, a variety of other heuristics may be used to identify (e.g., determine) the initial entry point and/or the unpacking function of the executable in addition to or instead of the example heuristics described above.

In some scenarios, executing malicious code automatically unpacks the code in its entirety. However, in other scenarios, executing a malicious executable only partially unpacks the executable. For example, when executing particularly malicious code in memory, it is possible that only a portion or part of the code will be unpacked. In other words, one or more portions or parts of the code may remain unpacked following execution. For example, in some instances executing malicious code will result in only unpacking a function that is called, or only unpacking a basic block of a function that is called (e.g., IF statement).

In a situation such as that described above, it may not be known that the entire binary file was not unpacked (or, stated differently, it may not be known that a portion of the binary file remains packed). In some embodiments, one or more of the example heuristics described above may be used to determine whether the entire executable was unpacked. In addition, one or more other heuristics may be used to determine whether or not the entire executable was unpacked upon execution, in accordance with some embodiments. For example, when only a portion of the binary file is unpacked, the unpacking function will likely remain in memory so that further unpacking can be performed at some later time, if desired. As such, a determination that the unpacking function remains in memory (e.g., did not disappear or was not deleted or freed from memory) when the executable was executed may be one indication that the entire executable was not unpacked. Another example heuristic that may be used to determine whether or not the entire executable was unpacked upon execution includes calculating the entropy of the entire binary file and determining that the entropy at specific locations of the file remains high (e.g., relative to other locations of file). The high entropy at certain locations of the file may be an indicator that some portions of the file remain compressed, encrypted, etc., and thus the entire file was not unpacked. Additional details regarding the determination of whether a binary file is partially unpacked, as well as the example heuristics that may be used to make such a determination, are provided below with respect to the example process shown in FIG. 5.

Figure 5:
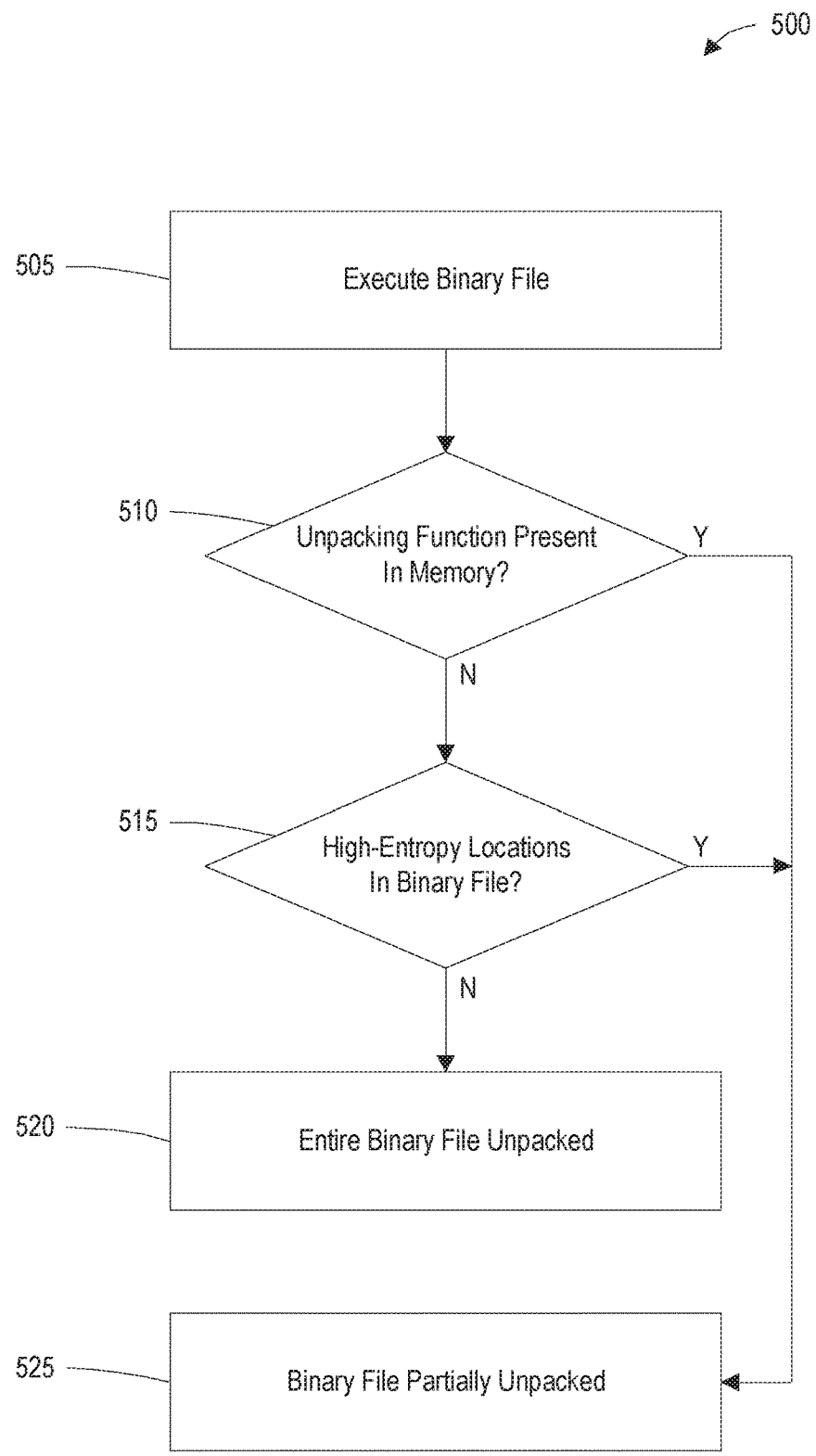
FIG. 5 is a flow diagram illustrating an example method for determining whether a malicious file is partially unpacked, according to one or more embodiments.

FIG. 5 illustrates an example process 500 for determining whether a malicious file is partially unpacked, in accordance with one or more embodiments. At block 505, a received binary file may be executed in a memory (e.g., a portion of memory 108 in the example computing device 100 shown in FIG. 1). At block 510, a determination may be made as to whether an unpacking function is present in the memory. If it is determined at block 510 that an unpacking function of the file is present in the memory (e.g., the unpacking function did not disappear following execution of the file), then at block 525 it may be determined that the binary file is only partially unpacked. On the other hand, if it is determined at block 510 that an unpacking function is not present in the memory (e.g., is absent from the memory), then at block 515 a determination may be made as to whether there are any high-entropy locations in the binary file. As described above, high entropy calculations at certain locations of the file may indicate that some portions of the file remain compressed, encrypted, etc. Thus, if it is determined at block 515 that there are certain high-entropy locations in the binary file, then a block 525 it may be determined that the binary file is only partially unpacked. On the other hand, if it is determined at block 515 that there are no (or very few) high entropy locations in the binary file, then at block 520 it may be determined that the entire binary file was unpacked when the file was executed.

It should be noted, however, that in some embodiments various other heuristics may be used to determine that a malicious file was not entirely unpacked, in addition to or instead of the example heuristics described above. As such, even in scenarios where it is determined that (i) no unpacking function is present in the memory and (ii) no high-entropy locations exist in the binary file, it is still possible that the binary file was only partially unpacked, in some embodiments.

In some embodiments, once a malicious executable is unpacked, in addition to identifying the initial entry point of the executable, various other post-processing may also be performed. For example, in an embodiment, the post-processing may include recreating (e.g., repairing, rebuilding, restoring, regenerating, etc.) the relocation table and/or other tables such as, for example, the import address table, export table, etc. For example, recreating the import address table may include going over the disassembly of the code and checking for each function being called outside the code section of the specific file, in an embodiment. These functions will have names such as, for example, "malloc", "free", "printf", etc. (most of which are known to those of ordinary skill in the art). In an embodiment, an export table may be rebuilt as part of the post-processing by, for example, hooking the operating system (OS) and observing which applications are trying to call functions inside the packed file (e.g., by name/location).

At least some of the various blocks, operations, and techniques described above may be implemented utilizing hardware, a processor executing firmware instructions, a processor executing software instructions, or any combination thereof. When implemented utilizing one or more processors executing software or firmware instructions, the software or firmware instructions may be stored in any tangible, non-transitory computer readable media such as a magnetic disk, an optical disk, a RAM, a ROM, a flash memory, a magnetic tape, etc. The software or firmware instructions may include machine readable instructions that, when executed by the one or more processors, cause the one or more processors to perform various acts.

When implemented in hardware, the hardware may comprise one or more of i) discrete components, ii) one or more integrated circuits, iii) one or more application-specific integrated circuits (ASICs), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
executing a malicious executable to create an unpacked version of the malicious executable in a physical memory;
dumping at least a portion of the physical memory, containing the unpacked version of the malicious executable, to a storage device;
determining an initial entry point for the malicious executable, wherein the initial entry point does not point to an unpacking function for the malicious executable; and
performing one or more post-processing operations to generate a new version of the malicious executable, wherein the new version of the malicious executable includes the initial entry point.

2. The method of claim 1, wherein the performing the one or more post-processing operations includes:
creating the new version of the malicious executable from a memory image of the unpacked version of the malicious executable.

3. The method of claim 1, wherein the performing the one or more post-processing operations includes one or more of:
recreating a relocation table of the malicious executable;
recreating an import address table of the malicious executable; and
recreating an export table of the malicious executable.

4. The method of claim 1, wherein the determining the initial entry point for the malicious executable includes:
determining the unpacking function of the malicious executable; and
identifying the initial entry point for the malicious executable based on a pointer at the end of the unpacking function.

5. The method of claim 4, wherein the determining the unpacking function of the malicious executable includes:
comparing the malicious executable to the unpacked version of the malicious executable; and
identifying, based on the comparing, a portion of code present in both the malicious executable and the unpacked version of the malicious executable.

6. The method of claim 1, wherein the dumping at least a portion of the physical memory to the storage device includes:
creating a first memory dump of the physical memory containing the unpacked version of the malicious executable to the storage device;
determining whether any portions of the malicious executable remains packed;
responsive to determining that a first portion of the malicious executable remains packed, unpacking the first portion of the malicious executable to the physical memory; and
creating a second memory dump of the physical memory containing the unpacked first portion of the malicious executable to the storage device.

7. The method of claim 1, further comprising:
subsequent to unpacking the malicious executable, determining that the unpacking function of the malicious executable is present in the physical memory; and
determining, based on the presence of the unpacking function in the physical memory, that a portion of the malicious executable remains packed.

8. A system, comprising:
one or more processors; and
one or more non-transitory, computer-readable memories coupled to the one or more processors, the one or more memories storing machine-readable instructions that, when executed by the one or more processors, cause the system to perform operations comprising:
unpacking a malicious program file by executing the malicious program file in a first portion of a memory device;
dumping the first portion of the memory device containing the unpacked malicious program file to a second portion of the memory device;
identifying an initial entry point of the malicious program file, wherein the initial entry point does not point to an unpacking function for the malicious program file; and
creating a new version of the malicious program file from a memory image of the unpacked malicious program file, the new version of the malicious program file including the initial entry point.

9. The system of claim 8, wherein the one or more memories further store machine-readable instructions that, when executed by the one or more processors, cause the one or more processors to perform operations comprising:
identifying the initial entry point of the malicious program file using one or more heuristics.

10. The system of claim 8, wherein the one or more memories further store machine-readable instructions that, when executed by the one or more processors, cause the one or more processors to perform operations comprising:
determining the unpacking function of the malicious program file; and
identifying the initial entry point of the malicious program file based on a pointer at the end of the unpacking function.

11. The system of claim 8, wherein the one or more memories further store machine-readable instructions that, when executed by the one or more processors, cause the one or more processors to perform operations comprising:
determining an expected location of the initial entry point in the first portion of the memory device;
identifying candidate initial entry points based on the expected location of the initial entry point; and
selecting one of the candidate initial entry points as the initial entry point of the malicious program file based on an outcome of executing an application corresponding to the one of the candidate initial entry points.

12. The system of claim 11, wherein the expected location of the initial entry point in the first portion of the memory device is determined based on one or more statistics.

13. The system of claim 11, wherein the one or more memories further store machine-readable instructions that, when executed by the one or more processors, cause the one or more processors to perform operations comprising:
identifying neighboring addresses of the expected location of the initial entry point in the first portion of the memory device; and
selecting the neighboring addresses as the candidate initial entry points.

14. The system of claim 8, wherein the one or more memories further store machine-readable instructions that, when executed by the one or more processors, cause the one or more processors to perform one or more of the following:

recreating a relocation table of the malicious program file;
recreating an import address table of the malicious program file; and
recreating an export table of the malicious program file.

15. A non-transitory, computer-readable medium having instructions stored thereon that, when executed by one or more processors, cause the one or more processors to perform operations comprising:
    executing a packed version of a malicious file to create an unpacked version of the malicious file in a physical memory;
    dumping at least a portion of the physical memory containing the unpacked version of the malicious file to a storage device;
    identifying an unpacking function of the malicious file;
    determining an initial entry point for the malicious file, wherein the initial entry point does not point to the unpacking function of the malicious file;
    performing one or more post-processing operations based on the unpacking function; and
    creating a new version of the malicious file based on the one or more post-processing operations, wherein the new version of the malicious file includes the initial entry point.

16. The non-transitory, computer-readable medium of claim 15, wherein the determining the initial entry point of the malicious file is based on a pointer at the end of the unpacking function.

17. The non-transitory, computer-readable medium of claim 15, wherein the determining the initial entry point of the malicious file is based on a jump or call instruction at the end of the unpacking function.

18. The non-transitory, computer-readable medium of claim 15, wherein the operations further comprise:
    identifying a portion of code present in the packed version of the malicious file that is absent from the unpacked version of the malicious file; and
    determining that the portion of code present in the packed version of the malicious file that is absent from the unpacked version of the malicious file is the unpacking function.

19. The non-transitory, computer-readable medium of claim 15, wherein the operations further comprise:
    identifying a function that writes to a text section of the malicious file in which code of a corresponding application resides as the unpacking function of the malicious file.

20. The non-transitory, computer-readable medium of claim 15, wherein the operations further comprise at least one of
    recreating a relocation table of the malicious file;
    recreating an import address table of the malicious file; and
    recreating an export table of the malicious file.

* * * * *

UNITED STATES PATENT AND TRADEMARK OFFICE
CERTIFICATE OF CORRECTION

PATENT NO. : 10,691,791 B2
APPLICATION NO. : 15/636905
DATED : June 23, 2020
INVENTOR(S) : Shlomi Boutnaru It is certified that error appears in the above-identified patent and that said Letters Patent is hereby corrected as shown below:

In the Claims

In Column 15 (Claim 6), Line 56, please delete "executable remains" and insert -- executable remain --.

Signed and Sealed this
Twenty-third Day of May, 2023

Katherine Kelly Vidal
*Director of the United States Patent and Trademark Office*